(12) United States Patent
Müller-Stach et al.

(10) Patent No.: US 9,533,295 B2
(45) Date of Patent: Jan. 3, 2017

(54) PT-PD DIESEL OXIDATION CATALYST WITH CO/HC LIGHT-OFF AND HC STORAGE FUNCTION

(75) Inventors: Torsten W. Müller-Stach, Hannover (DE); Alfred H. Punke, Walle (DE); Gerd Grubert, Hannover (DE); Marcus Hilgendorff, Hannover Bemerode (DE); Helke Doering, Shanghai (CN); Torsten Neubauer, Langenhagen (DE); Xiaolai Zheng, Princeton Junction, NJ (US); Chung-Zong Wan, Somerset, NJ (US); Wen-Mei Xue, Dayton, NJ (US); Patrick Burk, Freehold, NJ (US)

(73) Assignees: BASF CORPORATION, Florham Park, NJ (US); BASF SE, Ludwigshafen (DE)

( * ) Notice: Subject to any disclaimer, the term of this patent is extended or adjusted under 35 U.S.C. 154(b) by 19 days.

(21) Appl. No.: 14/384,517

(22) PCT Filed: Apr. 5, 2012

(86) PCT No.: PCT/US2012/032319
§ 371 (c)(1),
(2), (4) Date: Mar. 10, 2015

(87) PCT Pub. No.: WO2013/151549
PCT Pub. Date: Oct. 10, 2013

(65) Prior Publication Data
US 2015/0174564 A1 Jun. 25, 2015

(51) Int. Cl.
*B01D 53/94* (2006.01)
*B01J 23/42* (2006.01)
(Continued)

(52) U.S. Cl.
CPC .......... *B01J 29/7676* (2013.01); *B01D 53/944* (2013.01); *B01D 53/9477* (2013.01);
(Continued)

(58) Field of Classification Search
CPC ............... B01D 53/944; B01D 53/927; B01D 2255/1021; B01D 2255/1023; B01D 2255/50; B01D 2255/902; B01D 2258/012; F01N 3/035; F01N 3/0835; F01N 3/0857; F01N 3/103
See application file for complete search history.

(56) References Cited

U.S. PATENT DOCUMENTS

| 3,904,551 A | 9/1975 | Lundsager et al. |
|---|---|---|
| 4,329,162 A | 5/1982 | Pitcher, Jr. |

(Continued)

FOREIGN PATENT DOCUMENTS

| CN | 1366467 A | 8/2002 |
|---|---|---|
| CN | 101530787 | 9/2009 |

(Continued)

OTHER PUBLICATIONS

PCT International Search Report and Written Opinion in PCT/US2012/032319, mailed Nov. 5, 2012, 13 pages.
(Continued)

*Primary Examiner* — Timothy Vanoy
(74) *Attorney, Agent, or Firm* — Oblon, McClelland, Maier & Neustadt, L.L.P.

(57) ABSTRACT

A diesel oxidation catalyst for the treatment of exhaust gas emissions, such as the oxidation of unburned hydrocarbons (HC), and carbon monoxide (CO) and the reduction of nitrogen oxides (NOx) is described. More particularly, the present invention is directed to a washcoat composition comprising high silica to alumina zeolite and platinum and
(Continued)

palladium such that the zeolite minimizes negative interactions of these platinum group metals with the zeolite.

20 Claims, 2 Drawing Sheets

(51) Int. Cl.

| | |
|---|---|
| *B01J 23/44* | (2006.01) |
| *F01N 3/28* | (2006.01) |
| *B01J 29/76* | (2006.01) |
| *B01J 37/02* | (2006.01) |
| *B01J 29/035* | (2006.01) |
| *F01N 3/08* | (2006.01) |
| *F01N 3/10* | (2006.01) |
| *F01N 3/20* | (2006.01) |
| *F01N 3/035* | (2006.01) |
| *F01N 13/00* | (2010.01) |
| *B01J 21/04* | (2006.01) |
| *B01J 29/44* | (2006.01) |

(52) U.S. Cl.
CPC .............. *B01J 21/04* (2013.01); *B01J 23/44* (2013.01); *B01J 29/0354* (2013.01); *B01J 29/44* (2013.01); *B01J 29/7615* (2013.01); *B01J 37/0244* (2013.01); *B01J 37/0246* (2013.01); *F01N 3/035* (2013.01); *F01N 3/0814* (2013.01); *F01N 3/0842* (2013.01); *F01N 3/103* (2013.01); *F01N 3/2066* (2013.01); *F01N 13/009* (2014.06); *B01D 2255/1021* (2013.01); *B01D 2255/1023* (2013.01); *B01D 2255/2042* (2013.01); *B01D 2255/2047* (2013.01); *B01D 2255/2063* (2013.01); *B01D 2255/50* (2013.01); *B01D 2255/502* (2013.01); *B01D 2255/504* (2013.01); *B01D 2255/9022* (2013.01); *B01D 2255/9025* (2013.01); *B01D 2255/912* (2013.01); *B01D 2258/012* (2013.01); *B01J 2229/64* (2013.01); *F01N 2370/04* (2013.01); *F01N 2510/0684* (2013.01); *Y02T 10/24* (2013.01)

(56) References Cited

U.S. PATENT DOCUMENTS

| | | | |
|---|---|---|---|
| 4,335,023 | A | 6/1982 | Dettling et al. |
| 4,340,403 | A | 7/1982 | Higuchi et al. |
| 4,364,760 | A | 12/1982 | Higuchi |
| 4,403,008 | A | 9/1983 | Factor |
| 4,519,820 | A | 5/1985 | Oyobe et al. |
| 4,559,193 | A | 12/1985 | Ogawa et al. |
| 4,563,414 | A | 1/1986 | Ogawa et al. |
| 4,961,917 | A | 10/1990 | Byrne |
| 5,516,497 | A | 5/1996 | Speronello et al. |
| 6,171,556 | B1 | 1/2001 | Burk et al. |
| 7,875,573 | B2 | 1/2011 | Beutel et al. |
| 7,922,987 | B2 | 4/2011 | Koegel |
| 8,168,125 | B2 | 5/2012 | Choi |
| 2002/0198098 | A1 | 12/2002 | Yamamoto et al. |
| 2008/0045405 | A1 | 2/2008 | Beutel et al. |
| 2009/0320457 | A1 | 12/2009 | Wan |
| 2010/0180581 | A1 | 7/2010 | Grubert et al. |
| 2010/0180582 | A1 | 7/2010 | Mueller-Stach et al. |
| 2010/0183490 | A1* | 7/2010 | Hoke ................... B01D 53/945 423/213.5 |
| 2010/0186375 | A1 | 7/2010 | Kazi et al. |
| 2014/0209506 | A1* | 7/2014 | Domokos ................ B01J 23/42 208/60 |

FOREIGN PATENT DOCUMENTS

| | | |
|---|---|---|
| CN | 101733166 | 6/2010 |
| CN | 102369058 A | 3/2012 |
| JP | H05-168940 | 7/1993 |
| JP | 2000-061311 | 2/2000 |
| RU | 2438777 C2 | 1/2012 |

OTHER PUBLICATIONS

PCT International Preliminary Report on Patentability in PCT/US2012/032319, mailed Oct. 16, 2014, 9 pages.
Chinese Office Action Dated Oct. 8, 2015 in corresponding Patent Application No. 201280072223.8. (with translation).
Chinese Office Action issued Jun. 17, 2016 in corresponding Patent Application No. 201280072223.8. (with translation).
Foreign Office Action mailed Sep. 6, 2016 in Japanese Patent App. No. 2015-504536, filed Apr. 2, 2015.

* cited by examiner

PT-PD DIESEL OXIDATION CATALYST WITH CO/HC LIGHT-OFF AND HC STORAGE FUNCTION

CROSS-REFERENCE TO RELATED APPLICATIONS

This application is the National Stage entry of PCT/US2012/032319, filed on Apr. 5, 2012, which is incorporated herein by reference in its entirety.

FIELD

The present invention is directed to a Pt/Pd diesel oxidation catalyst with carbon monoxide/hydrocarbon (CO/HC) light-off and hydrocarbon (HC) storage functions. More specifically, the present invention is directed to a catalyst composition comprising a zeolite and a platinum group metal (PGM) such as platinum and palladium such that the zeolite minimizes negative interactions of these platinum group metals with the zeolite.

BACKGROUND

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their fuel economy, durability, and their ability to generate high torque at low speed.

From the standpoint of emissions, however, diesel engines present problems more severe than their spark-ignition counterparts. Emission problems relate to particulate matter (PM), nitrogen oxides (NOx), unburned hydrocarbons (HC) and carbon monoxide (CO). NOx is a term used to describe various chemical species of nitrogen oxides, including nitrogen monoxide (NO) and nitrogen dioxide ($NO_2$), among others.

The two major components of particulate matter are the volatile organic fraction (VOF) and a soot fraction (soot). The VOF condenses on the soot in layers, and is derived from the diesel fuel and oil. The VOF can exist in diesel exhaust either as a vapor or as an aerosol (fine droplets of liquid condensate) depending on the temperature of the exhaust gas. Soot is predominately composed of particles of carbon. The particulate matter from diesel exhaust is highly respirable due to its fine particle size, which poses health risks at higher exposure levels. Moreover, the VOF contains polycyclic aromatic hydrocarbons, some of which are suspected carcinogens.

Soot can be collected by wall-flow filters, which can comprise a multi-channel honeycomb structure having the ends of alternate channels on the upstream and downstream sides of the honeycomb structure plugged. This results in a checkerboard type pattern on either end. Channels plugged on the upstream or inlet end are opened on the downstream or outlet end. This permits the gas to enter the open upstream channels, flow through the porous walls and exit through the channels having open downstream ends. The gas to be treated passes into the catalytic structure through the open upstream end of a channel and is prevented from exiting by the plugged downstream end of the same channel. The gas pressure forces the gas through the porous structural walls into channels closed at the upstream end and opened at the downstream end. Such structures are primarily known to filter particles out of the exhaust gas stream. Often the structures have catalysts on the substrate, which enhance the oxidation of the particles. Typical patents disclosing such catalytic structures include U.S. Pat. Nos. 3,904,551; 4,329,162; 4,340,403; 4,364,760; 4,403,008; 4,519,820; 4,559,193; and 4,563,414.

Oxidation catalysts comprising a platinum group metal dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), or more simply catalytic converters, which are placed in the exhaust flow path from a diesel-powered engine to treat the exhaust before it vents to the atmosphere. Typically, the diesel oxidation catalysts are formed on ceramic or metallic substrate carriers (such as the flow-through monolith carrier, as described hereinbelow) upon which one or more catalyst coating compositions are deposited. In addition to the conversions of gaseous HC, CO and the SOF fraction of particulate matter, oxidation catalysts that contain platinum group metals (which are typically dispersed on a refractory oxide support) promote the oxidation of nitric oxide (NO) to $NO_2$.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, an adsorbent material, which may be a zeolite, may be provided as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature.

As discussed above, oxidation catalysts comprising a platinum group metal dispersed on a refractory metal oxide support are known for use in treating exhaust gas emissions from diesel engines. Platinum (Pt) remains the most effective platinum group metal for oxidizing CO and HC in a DOC, after high temperature aging under lean conditions and in the presence of fuel sulfur. Nevertheless, Pd incorporated catalysts offer advantages in stabilizing Pt at higher temperature aging (>700° C.) and lowering catalyst cost. However, Pd based DOCs typically show higher light-off temperatures for oxidation of CO and HC, especially when used with HC storage materials, potentially causing a delay in HC and or CO light-off. Pd containing DOCs may poison the activity of Pt to convert paraffins and/or oxidize NO and may also make the catalyst more susceptible to sulfur poisoning. These characteristics have typically prevented the use of Pd as an oxidation catalyst in lean burn operations especially for light duty diesel applications where engine temperatures remain below 250° C. for most driving conditions.

It would be desirable to provide catalytic articles that addresses one or more of the disadvantages mentioned above.

SUMMARY

A diesel oxidation catalyst for the treatment of exhaust gas emissions, such as the oxidation of unburned hydrocarbons (HC), and carbon monoxide (CO) and the reduction of nitrogen oxides (NOx) is provided. Embodiments of embodiments of the present invention are directed to a novel washcoat composition comprising a zeolite that minimizes negative interactions between the zeolite and platinum group metals.

In a first aspect, provided are catalytic articles for treating exhaust gas emissions from a diesel engine containing hydrocarbons, carbon monoxide, and particulate matter comprising a diesel oxidation catalyst and a substrate. The diesel oxidation catalyst comprises a first washcoat layer coated on said substrate comprising a high-surface area refractory metal oxide support, a platinum group metal component comprising platinum (Pt) and palladium (Pd) supported on the high surface area refractory metal oxide support, and a first zeolite component having a silica to alumina ratio that is greater than 1000.

A detailed aspect provides catalytic articles for treating exhaust gas emissions from a diesel engine containing hydrocarbons, carbon monoxide, and particulate matter comprising a diesel oxidation catalyst and a substrate, wherein the diesel oxidation catalyst comprises a first washcoat layer coated on said substrate and a second washcoat layer coated on the first washcoat layer, wherein one of the first and second washcoat layers comprises a high surface area refractory metal oxide support and the other of the first and second washcoat layers comprises a high surface area refractory metal oxide support, a platinum group metal component comprising platinum (Pt) and palladium (Pd) supported on the high surface area refractory metal oxide support, and a first zeolite component having a silica to alumina ratio greater than 1000.

A further aspect is a system for treatment of a diesel engine exhaust stream including hydrocarbons, carbon monoxide, and other exhaust gas components, the emission treatment system comprising: an exhaust conduit in fluid communication with the diesel engine via an exhaust manifold; the catalytic articles provided herein wherein the substrate is a flow through substrate or a wall-flow substrate; and one or more of the following in fluid communication with the composite: a soot filter, a selective catalytic reduction (SCR) catalytic article, and a NOx storage and reduction (NSR) catalytic article.

Other aspects include methods for treating a diesel exhaust gas stream containing hydrocarbons, carbon monoxide and particulate matter, the methods comprising: (a) providing the catalytic articles provided herein; (b) contacting said diesel exhaust gas stream with said catalytic article for the treatment of exhaust gas emissions so that the oxidation catalyst oxidizes hydrocarbons and carbon monoxide in the exhaust gas to carbon dioxide and water; and (c) conveying the exhaust gas exiting the diesel oxidation catalyst to a downstream soot filter and NOx conversion catalyst.

DETAILED DESCRIPTION

Figure 1:
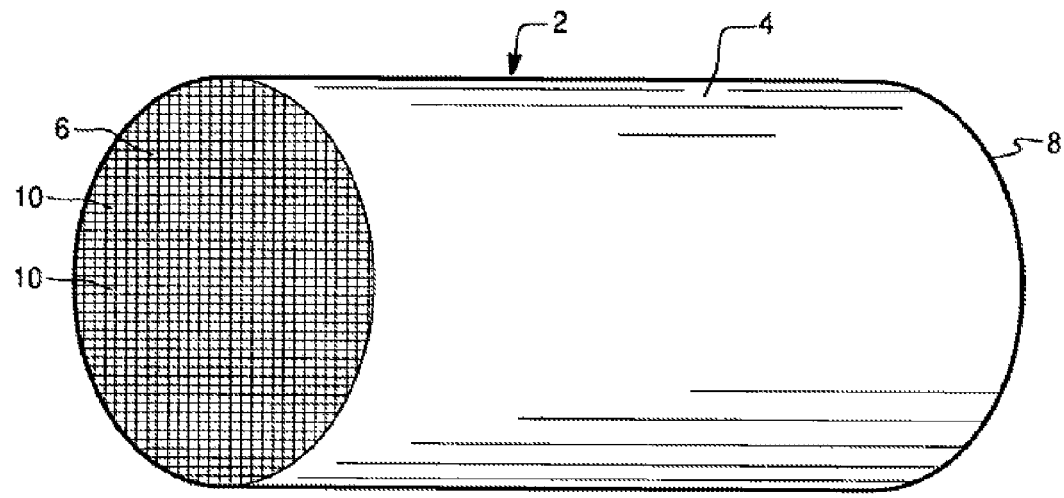
FIG. 1 is a perspective view of a honeycomb-type refractory carrier member which may comprise a diesel oxidation catalyst (DOC) washcoat composition according to one embodiment.

Before describing several exemplary embodiments of the invention, it is to be understood that the invention is not limited to the details of construction or process steps set forth in the following description. The invention is capable of other embodiments and of being practiced or being carried out in various ways.

The present invention is directed to a diesel oxidation catalyst (DOC) composition comprising a zeolite that minimizes negative interactions between the zeolite and platinum group metals. Such zeolites are characterized by high silica to alumina ratios (SARs). The SAR can be 250:1; 500:1; 750:1; 1000:1; 1200:1; 10,000:1. In one or more embodiments, the zeolite is substantially free of alumina, determination of which can be done by X-ray diffraction or Inductively Coupled Plasma analysis. Reference to "substantially free of alumina" means that the alumina recited is not intentionally provided in the zeolite. It is recognized, however, that to the extent alumina migrates or diffuses to the zeolite, such minor amounts are considered to be insubstantial (that is <4% by weight of the material, 3%, 2%, or even 1%). As used herein, therefore, a "zeolite substantially free from alumina" is a zeolite containing no more than 5000 ppm or 0.5% by weight of aluminum oxide.

The present invention is also directed to a method for treating diesel engine exhaust gas stream emissions containing unburned hydrocarbons (HC) and carbon monoxides (CO). An exhaust gas stream from a diesel engine can be treated in an emission treatment device containing the washcoat composition of embodiments of the present invention. In accordance with the present invention, the exhaust gas stream first comes into contact with a zeolite-containing layer and subsequently comes into contact with any layers thereunder.

The oxidation catalyst washcoat compositions of embodiments of the present invention can be applied to the substrate surfaces by any known means in the art. For example, the catalyst washcoat can be applied by spray coating, powder coating, or brushing or dipping a surface into the catalyst composition. The substrate can be a flow-through design or wall-flow design.

In a first aspect, provided are catalytic articles for treating exhaust gas emissions from a diesel engine containing hydrocarbons, carbon monoxide, and particulate matter comprising a diesel oxidation catalyst and a substrate. The diesel oxidation catalyst comprises a first washcoat layer coated on said substrate comprising a high-surface area refractory metal oxide support, a platinum group metal component comprising platinum (Pt) and palladium (Pd) supported on the high surface area refractory metal oxide support, and a first zeolite component having a silica to alumina ratio that is greater than 1000.

In one embodiment, the first zeolite component can have a silica to alumina ratio that is greater than 1200. In another embodiment, the first zeolite component is free of alumina. A further embodiment provides that the first washcoat layer contains a second zeolite component. The first zeolite component can be selected from a zeolite having the framework type beta, ZSM-5 (which is an MFI-type in accordance with International Zeolite Association (IZA) nomenclature), and MCM-22 (which is an MWW-type in accordance with International Zeolite Association (IZA) nomenclature). The high surface area refractory metal oxide support comprises one of alumina, silica, titania, ceria, and zirconia, physical mixtures thereof, chemical combinations thereof, and atomically-doped combinations thereof. In a detailed embodiment, the high surface area refractory metal oxide support comprises alumina. The first washcoat layer can further comprise a promoter that is one or more alkaline oxides selected from barium oxide (BaO), magnesium oxide (MgO), lanthanum oxide ($La_2O_3$), and mixtures thereof.

Other embodiments include a second washcoat layer being present on the first washcoat layer, the second washcoat layer comprising a high surface area refractory metal oxide support. The second washcoat layer can further comprise a platinum group metal component supported on the high surface area refractory metal oxide support.

Yet other embodiments can include a third washcoat layer being present on the second washcoat layer, the third washcoat layer comprising a high surface area refractory metal oxide support.

One or more embodiments provide that the second washcoat layer, the third washcoat layer, or both further comprises a zeolite component. The zeolites for the second and third washcoat layers can be independently selected from zeolites having the framework types beta, MFI, and MWW. These zeolites can also have a silica to alumina ratio that is greater than 1000 (or 1100, or even 1200, and the like).

A detailed aspect provides catalytic articles for treating exhaust gas emissions from a diesel engine containing hydrocarbons, carbon monoxide, and particulate matter comprising a diesel oxidation catalyst and a substrate, wherein the diesel oxidation catalyst comprises a first washcoat layer coated on said substrate and a second washcoat layer coated on the first washcoat layer, wherein one of the first and second washcoat layers comprises a high surface area refractory metal oxide support and the other of the first and second washcoat layers comprises a high surface area refractory metal oxide support, a platinum group metal component comprising platinum (Pt) and palladium (Pd) supported on the high surface area refractory metal oxide support, and a first zeolite component having a silica to alumina ratio greater than 1000. In one embodiment of the two-layered catalytic article, the first washcoat layer comprises the high surface area refractory metal oxide support. In an alternative embodiment, the second washcoat layer comprises the high surface area refractory metal oxide support. Another embodiment provides a third washcoat layer being present on the second washcoat layer, the third washcoat layer comprising a high surface area refractory metal oxide support and optionally a zeolite.

A further aspect is a system for treatment of a diesel engine exhaust stream including hydrocarbons, carbon monoxide, and other exhaust gas components, the emission treatment system comprising: an exhaust conduit in fluid communication with the diesel engine via an exhaust manifold; the catalytic articles provided herein wherein the substrate is a flow through substrate or a wall-flow substrate; and one or more of the following in fluid communication with the composite: a soot filter, a selective catalytic reduction (SCR) catalytic article, and a NOx storage and reduction (NSR) catalytic article.

Other aspects include methods for treating a diesel exhaust gas stream containing hydrocarbons, carbon monoxide and particulate matter, the methods comprising: (a) providing the catalytic articles provided herein; (b) contacting said diesel exhaust gas stream with said catalytic article for the treatment of exhaust gas emissions so that the oxidation catalyst oxidizes hydrocarbons and carbon monoxide in the exhaust gas to carbon dioxide and water; and (c) conveying the exhaust gas exiting the diesel oxidation catalyst to a downstream soot filter and NOx conversion catalyst. The NOx conversion catalyst can comprise a selective catalytic reduction (SCR) component located downstream of the catalyzed soot filter (CSF).

Reference to a "support" in a catalyst washcoat layer refers to a material that receives platinum group metals, stabilizers, promoters, binders, and the like through association, dispersion, impregnation, or other suitable methods. Useful high-surface area supports include one or more refractory oxides. High surface area refractory metal oxide supports refers to metal oxide supports having a surface area in excess of 20 $m^2/g$, and in specific embodiments in excess of 50 $m^2/g$. In one or more embodiments, the surface area may in the range of 60 to 350 $m^2/g$, and typically 90 to 250 $m^2/g$. Examples of suitable high surface area refractory metal oxides include, but are not limited to, alumina, silica, titania, ceria, and zirconia, as well as physical mixtures, chemical combinations and/or atomically-doped combinations thereof. In specific embodiments, the refractory metal oxide may contain a mixed oxide such as silica-alumina, amorphous or crystalline aluminosilicates, alumina-zirconia, alumina-lanthana, alumina-chromia, alumina-baria, alumina-ceria, and the like. In one embodiment, the support is specifically comprised of alumina which specifically includes the members of the gamma, delta, theta or transitional aluminas, such as gamma and eta aluminas, and, if present, a minor amount of other refractory oxide, e.g., about up to 20 weight percent. An exemplary refractory metal oxide comprises high surface area γ alumina having a specific surface area of about 50 to about 300 $m^2/g$. e.g., alumina support materials, also referred to as "gamma alumina" or "activated alumina," typically exhibit a BET surface area in excess of 60 square meters per gram ("$m^2/g$"), often up to about 200 $m^2/g$ or higher. "BET surface area" refers to the Brunauer, Emmett, Teller method for determining surface area by $N_2$ adsorption. Desirably, the active alumina has a specific surface area of 60 to 350 $m^2/g$, and typically 90 to 250 $m^2/g$. The loading on the refractory oxide support is specifically from about 0.5 to about 6 $g/in^3$, more specifically from about 2 to about 5 $g/in^3$ and most specifically from about 2.5 to about 3.5 $g/in^3$.

The high-surface area support material of the zeolite-containing layer is specifically a refractory oxide material which is selected from the group including compounds of alumina, alumina-ceria, zirconia, and mixtures thereof.

The zeolite-containing layer of embodiments of the present invention may contain one or more hydrocarbon (HC) storage component for the adsorption of hydrocarbons (HC). Typically, any hydrocarbon storage material can be used, e.g., a micro-porous material such as a zeolite or zeolite-like material that minimizes interactions of platinum group metals and the material. Specifically, the hydrocarbon storage material is a zeolite. The zeolite can be a natural or synthetic zeolite such as faujasite, chabazite, clinoptilolite, mordenite, silicalite, zeolite X, zeolite Y, ultrastable zeolite Y, ZSM-5 zeolite, offretite, or a beta zeolite. Specific examples of zeolite adsorbent materials have a high silica to alumina ratio. The zeolites may have a silica/alumina molar ratio of from at least about 250/1, 500/1, 750/1, 1000/1, specifically at least about 1200/1, with useful ranges of from about 1000/1 to 1200/1, to as well as about to 10,000/1 are also exemplified. Specific zeolites include ZSM, Y, and beta zeolites. A particularly specific adsorbent may comprise a beta zeolite having a high silica to alumina ratio of greater than >1000. The zeolite loading can be 0.1 $g/in^3$ or greater in order to guarantee sufficient HC storage capacity and to prevent a premature release of stored paraffins during the temperature ramp following a low temperature storage. Specifically, zeolite content is in the range of 0.4-0.7 g/in$^3$. Higher zeolite loadings than 1.0 g/in$^3$ may lead to premature release of stored toluene if present in the feed. A premature release of aromatics and paraffins from the zeolite may cause a delay in the CO and HC light-off.

In one embodiment, the one or more zeolites may be stabilized by ion exchange with a rare earth metal. In another embodiment, the washcoat layer(s) of embodiments of the present invention may include one or more rare earth oxides (e.g., ceria) to promote the oxidation of heavy HCs.

In one embodiment, the washcoat composition of embodiments of the present invention comprises two distinct washcoat layers coated on a single substrate or carrier member, one layer (e.g., the first or top washcoat layer) over top of the other (e.g., the second or bottom washcoat layer). In this embodiment, the second or bottom washcoat layer is coated over the entire axial length of a substrate (e.g., a flow-through monolith) and the first or top washcoat layer is coated over the entire axial length of the second or bottom washcoat layer.

Figure 2:
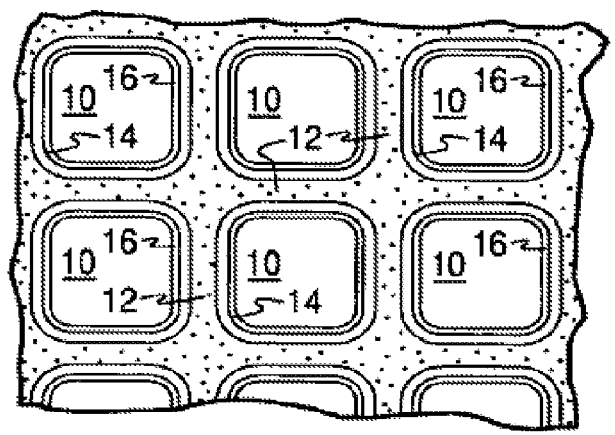
FIG. 2 is a partial cross-sectional view enlarged relative to FIG. 1 and taken along a plane parallel to the end faces of the carrier of FIG. 1, which shows an enlarged view of one of the gas flow passages shown in FIG. 1.

The washcoat composition of this embodiment may be more readily appreciated by reference to FIGS. 1 and 2. FIGS. 1 and 2 show a refractory carrier member 2, in accordance with one embodiment of present invention. Referring to FIG. 1, the refractory carrier member 2 is a cylindrical shape having a cylindrical outer surface 4, an upstream end face 6 and a downstream end face 8, which is identical to end face 6. Carrier member 2 has a plurality of fine, parallel gas flow passages 10 formed therein. As seen in FIG. 2 flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2 walls 12 are so dimensioned and configured that gas flow passages 10 have a substantially regular polygonal shape, substantially square in the illustrated embodiment, but with rounded corners in accordance with U.S. Pat. No. 4,335,023, issued Jun. 15, 1982 to J. C. Dettling et al. A discrete bottom layer 14, which in the art and sometimes below is referred to as a "washcoat", is adhered or coated onto the walls 12 of the carrier member. As shown in FIG. 2, a second discrete top washcoat layer 16 is coated over the bottom washcoat layer 14.

As shown in FIG. 2, the carrier member include void spaces provided by the gas-flow passages 10, and the cross-sectional area of these passages 10 and the thickness of the walls 12 defining the passages will vary from one type of carrier member to another. Similarly, the weight of washcoat applied to such carriers will vary from case to case. Consequently, in describing the quantity of washcoat or catalytic metal component or other component of the composition, it is convenient to use units of weight of component per unit volume of catalyst carrier. Therefore, the units grams per cubic inch ("g/in$^3$") and grams per cubic foot ("g/ft$^3$") are used herein to mean the weight of a component per volume of the carrier member, including the volume of void spaces of the carrier member.

During operation, exhaust gaseous emissions from a lean burn engine comprising hydrocarbons, carbon monoxide, nitrogen oxides, and sulfur oxides initially encounter the top washcoat layer 16, and thereafter encounter the bottom washcoat layer 14.

In another embodiment, the distinct washcoat layers of embodiments of the present invention may be zone coated such that one washcoat layer is on the upstream end, and the other washcoat on the downstream end, of the substrate. For example, an upstream washcoat layer can be coated over a portion of the upstream region of the substrate and a downstream washcoat layer can be coated over a downstream portion of the substrate. In this embodiment, the top washcoat layer of embodiments of the present invention is coated over the upstream potion of the substrate (i.e., the upstream washcoat layer) and the bottom washcoat layer is coated over a downstream portion of the substrate (i.e., the downstream washcoat layer).

According to one or more embodiments, the oxidation catalyst washcoat composition is disposed on a substrate. The substrate may be any of those materials typically used for preparing catalysts, and will specifically comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to herein as flow-through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc.

Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. The substrates useful for the catalysts of embodiments of the present invention can be ceramic or metallic.

The substrate can also be a honeycomb wall flow filter, wound or packed fiber filter, open-cell foam, sintered metal filter, etc., with wall flow filters being preferred. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces.

The diesel oxidation catalyst (DOC) of embodiments of the present invention can be used in an integrated emission treatment system comprising one or more additional components for the treatment of diesel exhaust gas emissions. For example, the emission treatment system may further comprise a soot filter component and/or a selective catalytic reduction (SCR) component. The diesel oxidation catalyst can be located upstream or downstream from the soot filter and/or selective catalytic reduction component.

In addition to treating the exhaust gas emissions via use of an oxidation catalyst the present invention may employ a soot filter for removal of particulate matter. The soot filter may be located upstream or downstream from the DOC, but is specifically located downstream from the diesel oxidation catalyst. In a specific embodiment, the soot filter is a catalyzed soot filter (CSF). The CSF of embodiments of the present invention comprises a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with a one or more high surface area refractory oxides (e.g., alumina, silica, silica alumina, zirconia, and zirconia alumina) and/or an oxidation catalyst (e.g., a ceria-zirconia) for the combustion of unburned hydrocarbons and to some degree particulate matter. However, specifically the soot burning catalyst is an oxidation catalyst comprising one or more platinum group metal (PM) catalysts (platinum, palladium, and/or rhodium).

In general, any known filter substrate in the art can be used, including, e.g., a honeycomb wall flow filter, wound or packed fiber filter, open-cell foam, sintered metal filter, etc., with wall flow filters being Specific. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes.

The porous wall flow filter used in embodiments of the invention is optionally catalyzed in that the wall of said element has thereon or contained therein one or more catalytic materials, such CSF catalyst compositions are described hereinabove. Catalytic materials may be present on the inlet side of the element wall alone, the outlet side alone, both the inlet and outlet sides, or the wall itself may consist all, or in part, of the catalytic material. In another embodiment, this invention may include the use of one or more washcoat layers of catalytic materials and combinations of one or more washcoat layers of catalytic materials on the inlet and/or outlet walls of the element.

The exhaust gas treatment system of embodiments of the present invention may further comprise a selective catalytic reduction (SCR) component. The SCR component may be located upstream or downstream of the DOC and/or soot filter. Specifically, the SCR component is located downstream of a soot filter component. A suitable SCR catalyst component for use in the emission treatment system is able to effectively catalyze the reduction of the NOx component at temperatures below 600° C., so that adequate NOx levels can be treated even under conditions of low load which typically are associated with lower exhaust temperatures. Specifically, the catalyst article is capable of converting at least 50% of the NOx component to $N_2$, depending on the amount of reductant added to the system. Another desirable attribute for the composition is that it possesses the ability to catalyze the reaction of $O_2$ with any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. No. 4,961,917 (the '917 patent) and U.S. Pat. No. 5,516,497, which are both hereby incorporated by reference in their entirety. Compositions disclosed in the '917 patent include one or both of an iron and a copper promoter present in a zeolite in an amount of from about 0.1 to 30 percent by weight, specifically from about 1 to 5 percent by weight, of the total weight of promoter plus zeolite. In addition to their ability to catalyze the reduction of NOx with $NH_3$ to $N_2$, the disclosed compositions can also promote the oxidation of excess $NH_3$ with $O_2$, especially for those compositions having higher promoter concentrations.

Figure 3:
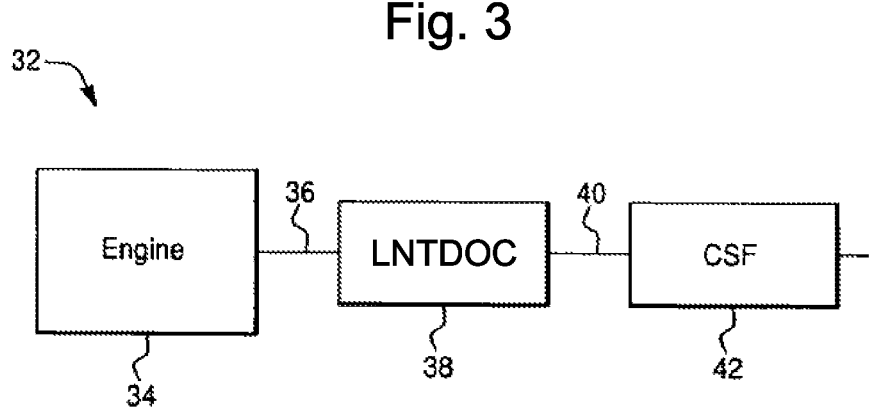
FIG. 3 is a schematic of an engine emission treatment system, in accordance with one embodiment.

In one embodiment, the present invention is directed to an emission treatment system comprising one or more additional components for the treatment of diesel exhaust gas emissions. An exemplified emission treatment system may be more readily appreciated by reference to FIG. 3, which depicts a schematic representation of an emission treatment system 32, in accordance with this embodiment of embodiments of the present invention. Referring to FIG. 3, an exhaust gas stream containing gaseous pollutants (e.g., unburned hydrocarbons, carbon monoxide and NOx) and particulate matter is conveyed via line 36 from an engine 34 to a diesel oxidation catalyst (DOC) 38, which is coated with the novel washcoat composition of embodiments of the present invention. In the DOC 38, unburned gaseous and non-volatile hydrocarbons (i.e., the VOF) and carbon monoxide are largely combusted to form carbon dioxide and water. In addition, a proportion of the NO of the NOx component may be oxidized to $NO_2$ in the DOC. The exhaust stream is next conveyed via line 40 to a catalyzed soot filter (CSF) 42, which traps particulate matter present within the exhaust gas stream. The CSF 42 is optionally catalyzed for passive regeneration. After removal of particulate matter, via CSF 42, the exhaust gas stream is conveyed via line 44 to a downstream selective catalytic reduction (SCR) component 16 for the treatment and/or conversion of NOx.

EXAMPLES

Example 1

Diesel oxidation catalyst composites were prepared by coating a variety of washcoats onto substrates. The washcoats contained zeolites of varying properties. For the washcoat layer, 1.0 g/in$^3$ of a high porous gamma alumina was impregnated with an aqueous solution of palladium nitrate to give a platinum group metal concentration of 1.3% by weight. Twice the amount of barium hydroxide was added and the resulting powder was dispersed in water to a dispersion with a solid content of 28% by weight. An amine stabilized hydroxo Pt IV complex was added to give a dry content of Pt and Pd in a 2:1 weight ratio. The pH value was adjusted by acid to a value of 4.0. The dispersion was milled to a particle size d90 of 15 µm. A zeolite as identified in Table 1 in the amount of 0.5 g/in$^3$ and 0.05 g/in$^3$ Boehmite were added and dispersed. The dispersion was subsequently coated onto a monolith, dried at 110° C. in air and calcined at 590° C. in air.

TABLE 1

| Example | Zeolite | Ionic Form | Si to Al ratio |
|---------|---------|------------|----------------|
| 1A | High Si/Al Beta | Proton-exchanged | 1000 |
| 1B | Beta | Proton-exchanged | Al-free |
| 1C | MWW | Proton-exchanged | Al-free |
| 1D | High Si/Al MFI | Proton-exchanged | 1200 |

Example 2

Comparative

Diesel oxidation catalyst composites were prepared by coating a variety of washcoats onto substrates. The washcoats contained zeolites of varying properties. For the washcoat layer, 1.0 g/in³ of a high porous gamma alumina was impregnated with an aqueous solution of palladium nitrate to give a platinum group metal concentration of 1.3% by weight. Twice the amount of barium hydroxide was added and the resulting powder was dispersed in water to form a dispersion with a solid content of 28% by weight. An amine stabilized hydroxo Pt IV complex was added to give a dry content of Pt and Pd in a 2:1 weight ratio. The pH value was adjusted by acid to a value of 4.0. The dispersion was milled to a particle size d90 of 15 µm. A zeolite as identified in Table 2 in the amount of 0.5 g/in³ and 0.05 g/in³ Boehmite were added and dispersed. The dispersion was subsequently coated onto a monolith, dried at 110° C. in air and calcined at 590° C. in air.

TABLE 2

| Example | Zeolite | Ionic Form | Si to Al ratio |
|---|---|---|---|
| 2A | Beta | Proton-exchanged | 150 |
| 2B | ZSM-5 | Proton-exchanged | 90 |

Example 3

Testing

The composites of Examples 1 and 2 were aged on a 4-cyl. light duty diesel engine with 2.7 L engine displacement for 20 hours at a constant temperature of 750° C. Catalysts were then evaluated for their activity during a new European driving cycle (NEDC) on a 2.0 L 4-cylinder diesel engine. The catalyst activity was evaluated by measuring inlet and outlet concentrations during the driving cycle. The overall CO conversion over the evaluation cycle was calculated as the ratio of the difference between inlet and outlet concentration and the inlet concentration. The results for CO conversion (in %, y-axis) are shown in Table 3 as an average value of 3 consecutive test runs for each formulation.

TABLE 3

| Example | CO conversion (%) |
|---|---|
| 1A | 56.9 |
| 1B | 57.4 |
| 1C | 55.8 |
| 1D | 56.8 |
| 2A COMPARATIVE | 52.8 |
| 2B COMPARATIVE | 53.8 |

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

What is claimed is:

1. A catalytic article for treating exhaust gas emissions from a diesel engine containing hydrocarbons, carbon monoxide, and particulate matter comprising a diesel oxidation catalyst and a substrate:
    the diesel oxidation catalyst comprising a first washcoat layer coated on said substrate comprising a high-surface area refractory metal oxide support, a platinum group metal component comprising platinum (Pt) and palladium (Pd) supported on the high surface area refractory metal oxide support, and a first zeolite component having a silica to alumina ratio that is greater than 1000, or is free of alumina.

2. The catalytic article of claim 1, wherein the first zeolite component has a silica to alumina ratio that is greater than 1200.

3. The catalytic article of claim 1, wherein the first zeolite component is free of alumina.

4. The catalytic article of claim 1, wherein the first washcoat layer contains a second zeolite component.

5. The catalytic article of claim 1, wherein the first zeolite component is selected from a zeolite having the framework type beta, MFI, and MWW.

6. The catalytic article of claim 1, wherein the high surface area refractory metal oxide support comprises one of alumina, silica, titania, ceria, and zirconia, physical mixtures thereof, chemical combinations thereof, and atomically-doped combinations thereof.

7. The catalytic article of claim 6, wherein the high surface area refractory metal oxide support comprises alumina.

8. The catalytic article of claim 1, wherein a second washcoat layer is present on the first washcoat layer, the second washcoat layer comprising a high surface area refractory metal oxide support.

9. The catalytic article of claim 8, wherein the second washcoat layer further comprises a platinum group metal component supported on the high surface area refractory metal oxide support.

10. The catalytic article of claim 8, wherein a third washcoat layer is present on the second washcoat layer, the third washcoat layer comprising a high surface area refractory metal oxide support.

11. The catalytic article of claim 10, wherein the second washcoat layer, the third washcoat layer, or both further comprises a zeolite component.

12. The catalytic article of claim 1, wherein the first washcoat layer further comprises a promoter that is one or more alkaline oxides selected from barium oxide (BaO), magnesium oxide (MgO), lanthanum oxide ($La_2O_3$), and mixtures thereof.

13. The catalytic article of claim 1, wherein substrate is a flow through substrate or a wall-flow substrate.

14. A catalytic article for treating exhaust gas emissions from a diesel engine containing hydrocarbons, carbon monoxide, and particulate matter comprising a diesel oxidation catalyst and a substrate:
    the diesel oxidation catalyst comprising a first washcoat layer coated on said substrate and a second washcoat layer coated on the first washcoat layer, wherein one of the first and second washcoat layers comprises a high surface area refractory metal oxide support and the other of the first and second washcoat layers comprises a high surface area refractory metal oxide support, a platinum group metal component comprising platinum (Pt) and palladium (Pd) supported on the high surface area refractory metal oxide support, and a first zeolite component having a silica to alumina ratio greater than 1000, or is free of alumina.

15. The catalytic article of claim 14, wherein the first washcoat layer comprises the high surface area refractory metal oxide support.

16. The catalytic article of claim 14, wherein the second washcoat layer comprises the high surface area refractory metal oxide support.

17. The catalytic article of claim 14, wherein a third washcoat layer is present on the second washcoat layer, the third washcoat layer comprising a high surface area refractory metal oxide support and optionally a zeolite.

18. A system for treatment of a diesel engine exhaust stream including hydrocarbons, carbon monoxide, and other exhaust gas components, the emission treatment system comprising:

an exhaust conduit in fluid communication with the diesel engine via an exhaust manifold;

the catalytic article claim 1 wherein the substrate is a flow through substrate or a wall-flow substrate; and one or more of the following in fluid communication with the composite: a soot filter, a selective catalytic reduction (SCR) catalytic article, and a NOx storage and reduction (NSR) catalytic article.

19. A method for treating a diesel exhaust gas stream containing hydrocarbons, carbon monoxide and particulate matter, the method comprising: (a) providing the catalytic article of claim 1; (b) contacting said diesel exhaust gas stream with said catalytic article for the treatment of exhaust gas emissions so that the oxidation catalyst oxidizes hydrocarbons and carbon monoxide in the exhaust gas to carbon dioxide and water; and (c) conveying the exhaust gas exiting the diesel oxidation catalyst to a downstream soot filter and NOx conversion catalyst.

20. The method of claim 19, wherein the NOx conversion catalyst comprises a selective catalytic reduction (SCR) component located downstream of the catalyzed soot filter (CSF).

* * * * *